(12) United States Patent
Soto et al.

(10) Patent No.: US 6,472,776 B1
(45) Date of Patent: Oct. 29, 2002

(54) HELMET MOUNT FOR NIGHT VISION DEVICE

(75) Inventors: Ronald R. Soto, Laguna Hills, CA (US); Jonathan R. Prendergast, Newport Beach, CA (US); Brian K. Crawford, Flagstaff, AZ (US); David A. Robinson, Huntington Beach, CA (US)

(73) Assignee: Norotos, Inc., Santa Ana, CA (US)

( * ) Notice: Subject to any disclaimer, the term of this patent is extended or adjusted under 35 U.S.C. 154(b) by 0 days.

(21) Appl. No.: 09/538,828

(22) Filed: Mar. 30, 2000

(51) Int. Cl.[7] ................................................. G11C 13/02
(52) U.S. Cl. ...................................... 307/400; 359/409
(58) Field of Search ................................. 307/140, 415, 307/400, 406; 359/409, 410, 815, 630

(56) References Cited

U.S. PATENT DOCUMENTS

| | | | |
|---|---|---|---|
| 4,449,787 A | * 5/1984 | Burbo et al. | 350/535 |
| 4,689,834 A | 9/1987 | McCarthy et al. | 2/422 |
| 5,176,342 A | 1/1993 | Schmidt et al. | 244/122 AE |
| 5,226,181 A | 7/1993 | Polednak et al. | 2/422 |
| 5,331,684 A | 7/1994 | Baril et al. | 2/6.2 |
| 5,347,119 A | 9/1994 | Connors | 250/214 VT |
| 5,408,086 A | 4/1995 | Morris et al. | 250/214 VT |
| 5,467,479 A | * 11/1995 | Mattes | 2/6.3 |
| 5,469,578 A | 11/1995 | Mattes | 2/6.7 |
| 5,471,678 A | 12/1995 | Dor | 2/6.7 |
| 5,506,730 A | * 4/1996 | Morley | 359/815 |
| 5,542,627 A | 8/1996 | Crenshaw et al. | 244/121 |
| 5,648,862 A | 7/1997 | Owen | 359/153 |
| 5,703,354 A | 12/1997 | Wannagot et al. | 250/214 VT |
| 5,914,816 A | * 6/1999 | Solo et al. | 359/630 |

* cited by examiner

Primary Examiner—Edward H. Tso
Assistant Examiner—Lawrence Luk
(74) Attorney, Agent, or Firm—Christie, Parker & Hale, LLP

(57) ABSTRACT

A flip-up helmet mount for a night vision device with a goggle horn for attachment to the helmet mount is disclosed. The flip-up helmet mount includes an adjustable socket assembly for mounting goggle horns with varying dimensions therein, and an improved automatic shutdown assembly that provides for reliable shutdown of the night vision device when not operational. Additionally, the flip-up helmet mount includes a position adjustment assembly for adjusting the position of the night vision device between a use and a stowed position, a tilt adjustment assembly for adjusting the tilt angle of the night vision device relative to a user's eyes, and a focal adjustment assembly for adjusting the focus or location of the night vision device relative to the user's eyes. The assemblies provided for position, tilt, and focus adjustment all permit one-handed adjustment of these features of the flip-up helmet mount.

14 Claims, 12 Drawing Sheets

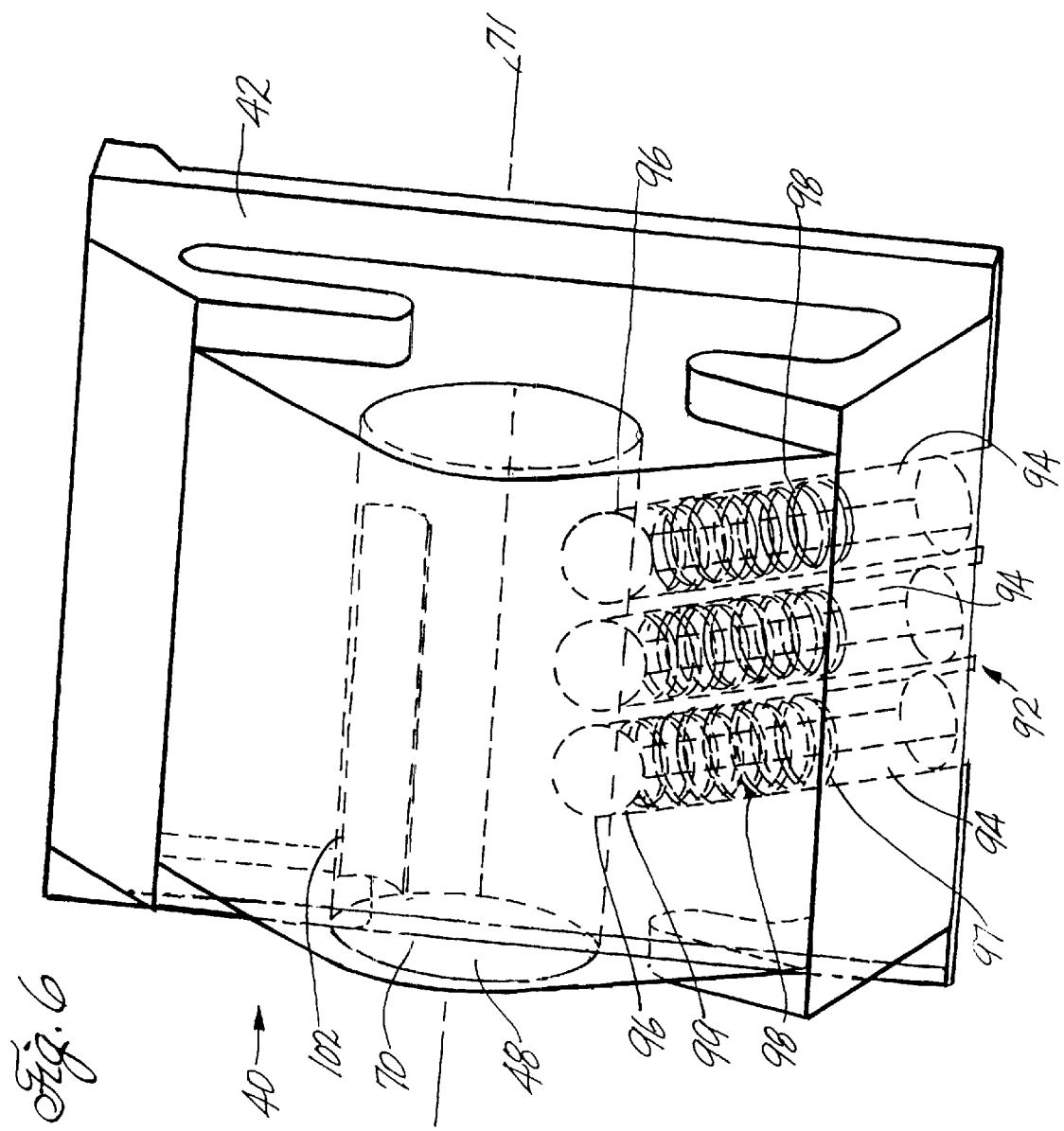

HELMET MOUNT FOR NIGHT VISION DEVICE

FIELD OF THE INVENTION

This invention relates generally to mounting assemblies for night vision devices, and more particularly to a flip-up helmet mount for night vision devices that includes an adjustable socket assembly for mounting the goggles to the helmet mount, automatic shutdown assemblies, position adjustment, tilt adjustment, and focal adjustment, wherein the position, tilt, and focal adjustment are designed to allow for one-hand operation by the user of the night vision device.

BACKGROUND OF THE INVENTION

Night vision devices are commonly used by military personnel for conducting operations in low light or night conditions. The night vision devices utilized by the military typically include image intensifier tubes and associated optics that convert infrared and near infrared light into viewable images. A common night vision device currently being used in the U.S. Army is the PVS7 night vision device, manufactured by ITT Corporation in Roanoke, Va.

Assemblies for mounting night vision devices to a helmet are well known in the art. These mounting assemblies allow a user's hands to remain free while viewing a scene through the night vision device. Prior art mounting assemblies typically include one or more of the following features: positional adjustment of the night vision device between a use and stowed position; tilt angle adjustment of the night vision device relative to the user's eyes; focal adjustment of the location of the night vision device relative to the user's eyes; and automatic shutdown of the night vision device when not in the use position.

A known mounting assembly for night vision devices encompasses a flip-up helmet mount that attempts to provide all of the features identified above. However, that device is believed to be deficient in its operational aspects because, among other reasons, the flip-up helmet mount is not designed for one-handed operation. More particularly, the tilt adjustment means disclosed requires a user to loosen a locking knob with one hand, while at the same time repositioning the night vision device with the other hand. Obviously, given the conditions under which night vision devices are typically used, it is undesirable and potentially unsafe for adjustment of the night vision device to occupy both hands of the operator. If both hands of the operator are required to adjust the night vision device, then the operator will be unable to continue carrying a weapon or other equipment in one of his hands. It can certainly be appreciated that having to put down one's weapon in order to adjust the night vision device may expose the operator of the night vision device to certain unnecessary risks.

Known flip-up helmet mounts are also deficient in operational aspects because of jamming susceptibility of the automatic shutdown assembly. The automatic shutdown assembly includes a magnet housing having an S-shape or question-mark shape. A combination of an S-shaped cavity for movement of a relatively long, narrow bar magnet within results in an automatic shutdown assembly with questionable reliability. Specifically, the long, narrow bar magnet can easily become askew within the S-shaped cavity as the magnet moves within the cavity. When the magnet becomes askew within the cavity, the automatic shutdown assembly becomes jammed and the night vision device does not automatically turn off when rotated into the stowed position. This is obviously undesirable since the phosphor yellow/green light emitted from the night vision device would then be visible to possibly hostile personnel in front of the operator.

Known flip-up helmet mounts are inadequate for the conditions in which the night vision devices are typically used. For example, when the helmet mount is moved from one position to another, the magnet in the automatic shutdown assembly produces a significant amount of noise upon contacting the end of the cavity. Obviously, excessive noise can draw unwanted attention to the operator of the night vision device. It is also important that the automatic shutdown assembly not intermittently turn the goggles off in use or on while not in use due to inadvertent movement of the magnet caused by movement of a person wearing the goggles. In another known flip-up helmet mount, a significant amount of noise is produced by a rib that is received into one of two grooves for retaining the night vision device in either the use or the stowed position.

Further, the focal adjustment assembly of the known mount requires the operator of the night vision device to apply force inwardly to a pair of release buttons in order to adjust the location of the night vision device relative to his eyes. It is believed that this requires a rather awkward movement of the hand or hands of the operator that makes focal adjustment relatively difficult.

Night vision devices and helmet mounts are often manufactured by different manufacturers. So that the parts will fit together, they are manufactured to certain specifications but having dimension variations of up to 10/1000". The fit of the goggles into the helmet mount chassis is difficult with such variances. The fit should not be too loose, as noise emitting from jiggling contact between the goggles and the chassis (for instance, when the user is in motion) should be avoided. Moveover, jiggling of the goggles in the mount makes it more difficult to see clearly through the goggles. Yet, the fit of the goggles should not be so tight that it is difficult for the goggles to be connected with the helmet mount, or disconnected therefrom. A snug fit of the goggles into the helmet mount is desired with a minimum amount of force required to insert the goggles into the helmet mount.

These and other problems exist with the flip-up helmet mounts for night vision devices disclosed in the prior art. Consequently, a need exists for an improved flip-up helmet mount.

SUMMARY OF THE INVENTION

The present invention, therefore, provides an improved flip-up helmet mount for night vision devices. More particularly, the flip-up helmet mount according to the present invention is designed to allow for a substantially quiet automatic shut-off night vision device that operates only when intended, and to allow for a snug fit of night vision devices into the helmet mount. In addition, the flip-up helmet mount is designed to allow for one-handed adjustment of the position, tilt, and focus of the night vision device.

The flip-up helmet mount includes a helmet block for securing the night vision device to a helmet, and a chassis for receiving the night vision device. The chassis is rotationally coupled to the helmet block by a bracket member extending between the helmet block and the chassis.

In a presently preferred embodiment, a goggle horn of the night vision device is secured into an adjustable socket assembly having an upper socket and a lower socket coupled to the upper socket. The lower and upper sockets have a goggle horn receiving area that substantially corresponds to the wedge-shaped goggle horn. However, the goggle horn receiving area is dimensioned to be slightly smaller than the smallest possible horn given the allowed tolerances.

Preferably, lower socket is capable of moving 20/1000" in a direction away from the upper socket while still being coupled thereto. Screws that provide the connection between the upper and lower sockets are placed through smooth holes in the lower socket, the holes with a counterbore spaced from the head of the screws, and connected to threaded holes in the upper socket. A spring is provided around each screw in the lower socket that biases the lower socket toward the upper socket. However, the counterbore allows the lower socket to be moved away from the upper socket against the spring force. Because the screws have a threaded connection to the upper socket, the upper socket and the screws maintain their positions relative to one another. As a result, the upper socket and the lower socket may separate while accommodating a goggle horn into the goggle horn receiving area.

The goggle horn slides over a detent in the goggle horn receiving area until the detent is received into an aperture in the goggle horn. When the detent is received into the goggle horn, the spring is biased to the original position thereby pulling the lower socket closer to the upper socket. Because of the dimensions of the goggle horn receiving area, a horn will always be under spring pressure while in the receiving area with the upper and lower sockets spread at least some distance apart.

A position adjustment assembly is provided within the helmet block for adjusting the night vision device between a use position, in front of the user's eyes, and a stowed position, out of the line-of-sight of the user. The flip-up helmet device includes an automatic shutdown assembly for automatically shutting down the night vision device when it is not in the use position. Further, in a presently preferred embodiment, the automatic shutdown assembly includes a magnet module having a vertically extending cavity with a substantially oval-shaped profile. A cylindrical bar magnet is slidably received within the cavity to move in response to movement of the night vision device between the use and stowed position. The automatic shutdown assembly automatically shuts down the night vision device whenever it is not in the use position. The shape of the cavity and the dimensions of the bar magnet combine to produce a reliable automatic shutdown assembly that is essentially jam proof. Placed in the cavity with the magnet is a damping fluid that has sufficient viscosity to slow the velocity of the magnet when the positions are being changes, so that noise emitted from contact of the magnet with the cavity sides is substantially eliminated. The fluid also reduces the possibility of inadvertent operation.

In a presently preferred embodiment, the position adjustment assembly includes a spring-biased ball and detent system, wherein a plurality of balls are biased by springs toward a shaft, rotationally received in a transverse bore in the helmet block, that includes a pair of transverse detents extending along the length of the shaft, corresponding to the use and stowed position of the night vision device. The spring-biased ball and detent system provides for extremely quiet operation of the flip-up helmet mount.

A tilt adjustment assembly is additionally provided for adjusting the tilt angle of the chassis relative to the bracket member, and thus the night vision device relative to the user's eyes. The tilt adjustment assembly includes a cam system, wherein rotation of a cam knob produces rotation of the chassis relative to the bracket member. The cam based tilt adjustment assembly provides for one-handed adjustment of the tilt angle of the night vision device. Moreover, the cam based assembly permits substantially infinite adjustment of the tilt angle within a predetermined range.

Additionally, in a presently preferred embodiment, a focal adjustment assembly is provided for adjusting the location of the night vision device relative to the chassis. The focal adjustment assembly includes a hinged release lever that is biased by a return spring to engage one of a plurality of notches on one of a pair of racks of the chassis. The night vision device is slidably received on the racks of the chassis. Application of a downward force on the release lever disengages the release lever from the notch and permits adjustment of the location of the night vision device relative to the chassis. The single release-lever provides for one-handed adjustment of the location of the night vision device and is believed to be ergonomically superior to prior art systems.

BRIEF DESCRIPTION OF THE DRAWINGS

These and other features and advantages of the present invention will be appreciated as the same become better understood by reference to the following Detailed Description when considered in connection with the accompanying drawings, wherein:

FIG. 5 is a side elevation view of one of the racks of the chassis of the flip-up helmet mount of FIG. 2;

FIG. 6 is a perspective view of the helmet block;

FIG. 7 is a partial cross-sectional view of the automatic shutdown assembly, with the night vision device in the use position;

FIG. 8 is a partial cross-sectional view of the automatic shutdown assembly, with the night vision device in the stowed position;

FIG. 9b is a front view of the adjustable socket assembly of FIG. 9a;

FIGS. 10a, 10b, and 10c are back, top, and front views respectively of the lower socket of the adjustable socket assembly of FIG. 9a;

FIGS. 12a and 12b are front and bottom views respectively of the upper socket of the adjustable socket assembly of FIG. 9a;

DETAILED DESCRIPTION

Figure 1:
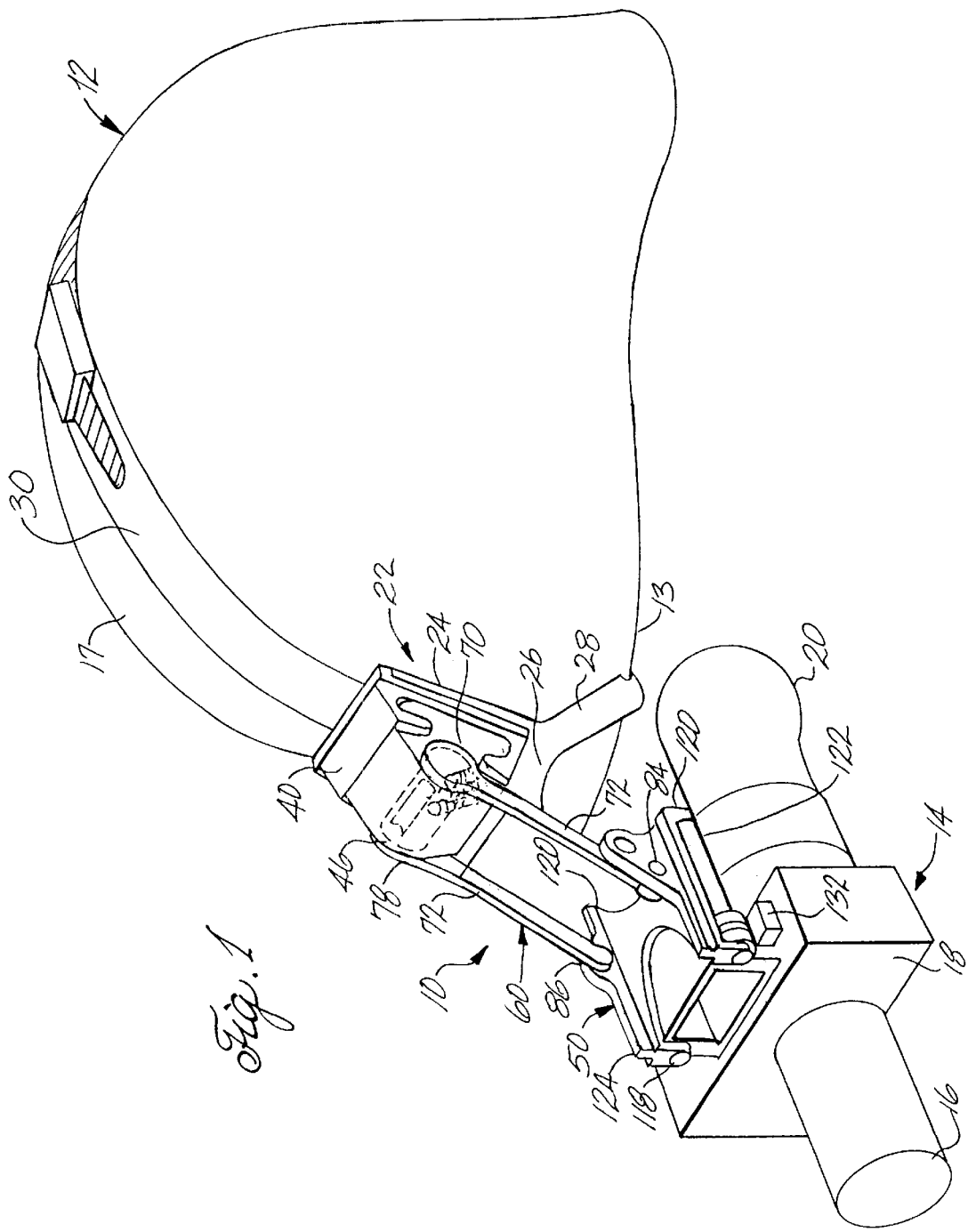
FIG. 1 is a perspective view of the flip-up helmet mount provided for in the present invention secured to a helmet, wherein the night vision device is in a use position.

Referring now to FIG. 1, a presently preferred embodiment of a flip-up helmet mount 10 according to the present invention is shown. The flip-up helmet mount 10 is shown in use with a standard U.S. Army Kevlar composite helmet 12. A night vision device 14 is secured to the helmet 12 by use of the flip-up helmet mount 10. The night vision device 14 shown in FIG. 1 is a device that includes a single objective lens 16, a housing 18, and a pair of eye pieces 20. To use the night vision device, the operator places it in the position depicted in FIG. 1 and looks into the eye pieces 20 to see an enhanced image representative of the low-level light from a night scene which has entered the objective lens.

The flip-up helmet mount 10 may be secured to the helmet in any of the ways well known in the art. FIG. 1 shows the flip-up helmet mount secured to the helmet by means of a quick release mechanism assembly 22. The quick release mechanism assembly includes a brace plate 24 having a broad based hook member 26. The hook member 26 includes a pair of laterally spaced apart hook portions 28, which engage under a brim 13 of the helmet. The quick release mechanism may be secured to the helmet by a strap 30 that includes ratchet means for adjusting the strap relative to the helmet to ensure a sung fit on various sizes of helmets. Alternatively, fasteners may be used to secure the quick release mechanism assembly directly to the helmet.

Figure 2:
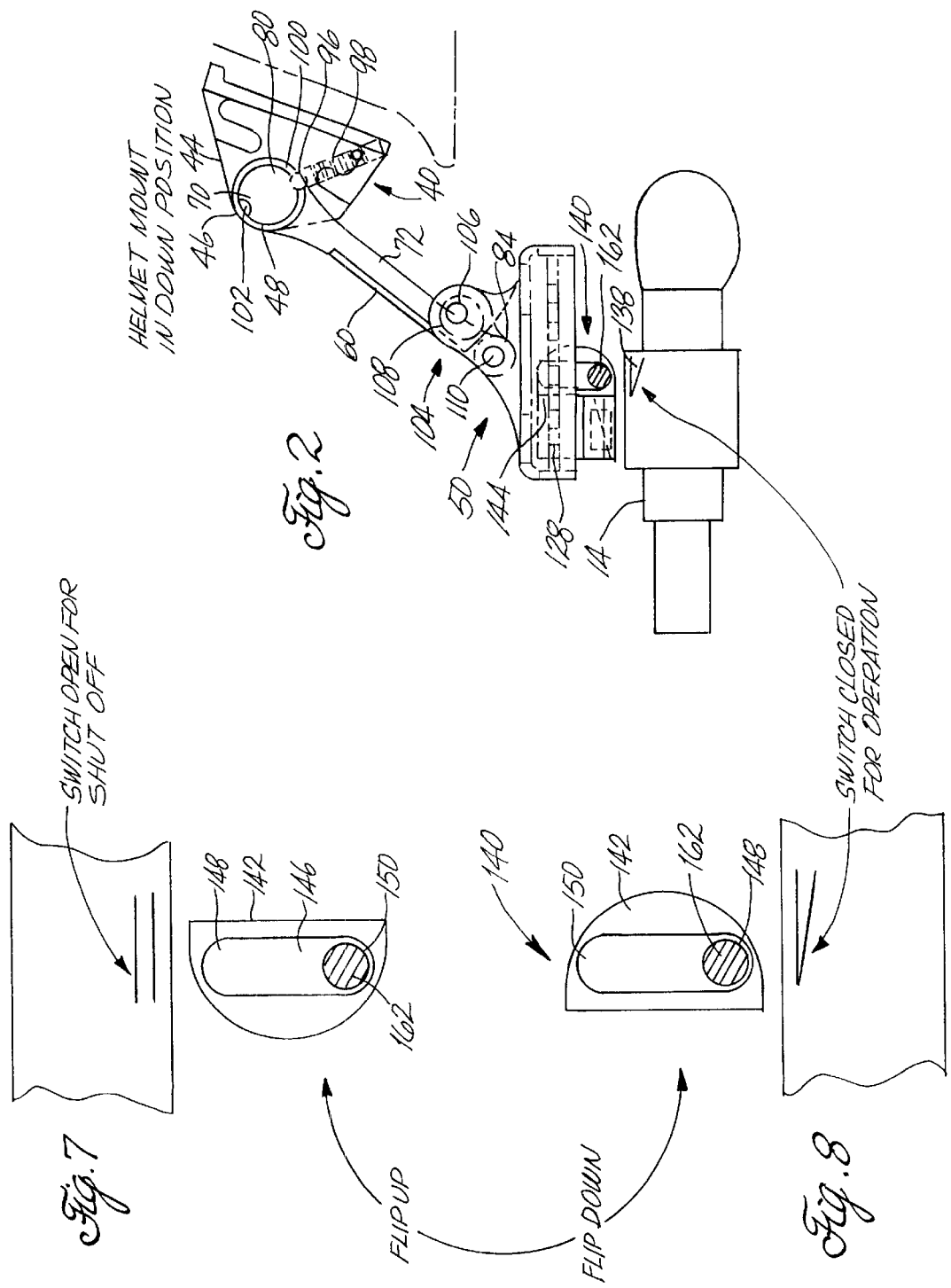
FIG. 2 is a side elevation view of the flip-up helmet of FIG. 1, removed from the helmet.

The flip-up helmet mount 10 includes a helmet block 40, which is releasably secured to the quick release mechanism assembly. A rear surface 42 of the helmet block (see FIG. 6) engages the brace plate 24 of the quick release mechanism assembly when the flip-up helmet mount is secured to the helmet. As can be seen in FIG. 1, a front surface 44 of the helmet block 40 (see FIG. 2) defines a transverse boss 46 having a transverse bore 48 therein. As will be described in more detail below, the night vision device is rotationally coupled with the helmet block to allow the user to pivot the night vision device between a use and a stowed position.

The flip-up helmet mount 10 also includes a chassis 50 slidably coupled with a socket assembly 52. The night vision device 14 is coupled with socket assembly 52. The socket assembly is slidably adjustable relative to the chassis to allow focal adjustment of the night vision device. The chassis is also coupled with the helmet block by an upright, or bracket member 60. The chassis is rotationally coupled with the bracket member at a proximal end of the bracket member to allow for tilt angle adjustment of the night vision device as described in more detail below.

Figure 9A:
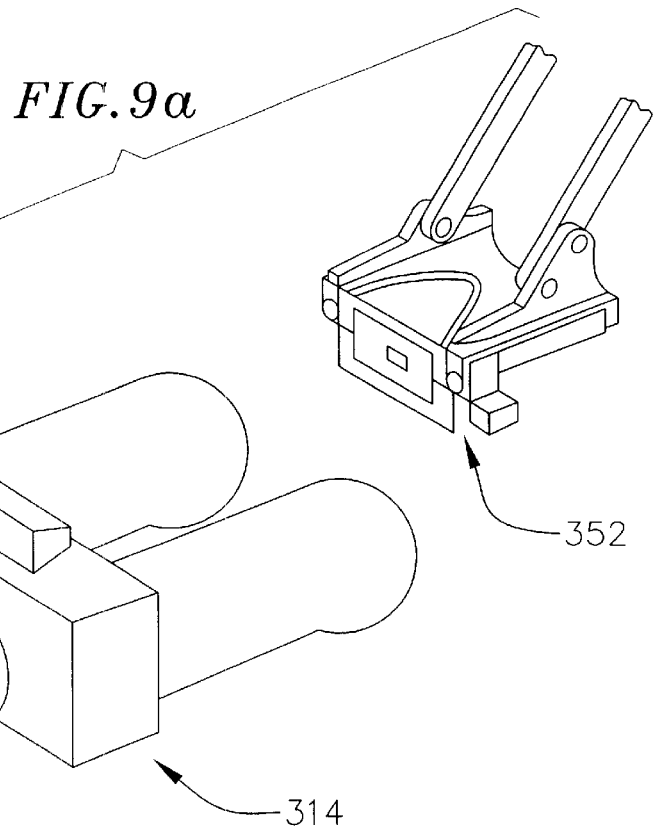
FIG. 9a is an expanded perspective view of the night vision device with a goggle horn that is receivable into an adjustable socket assembly.
Figure 9B:
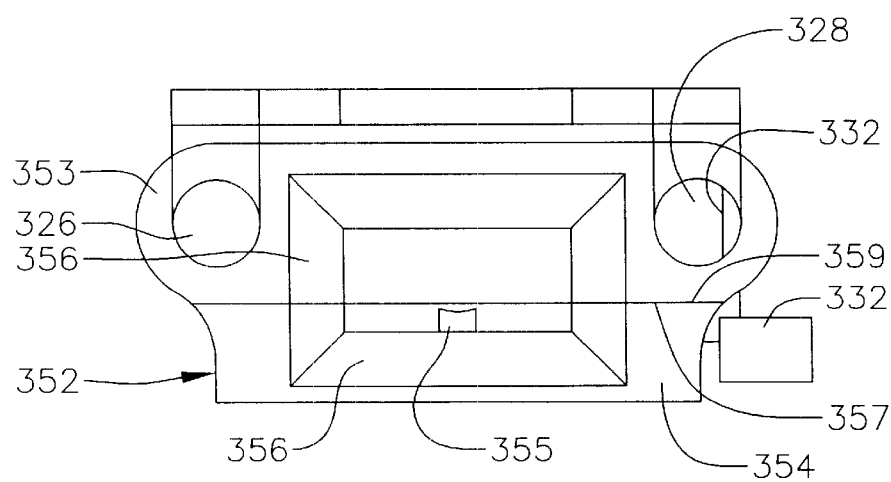
Figure 11:
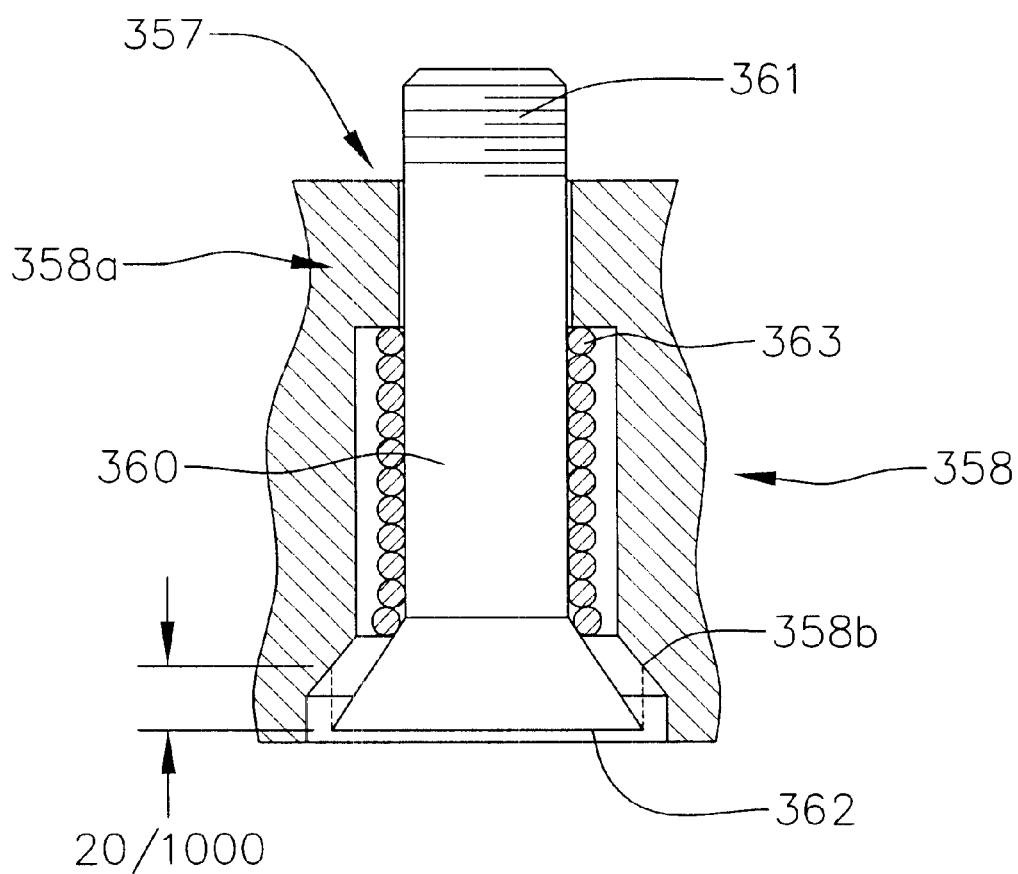
FIG. 11 is a cross-sectional view of a screw placed through one of the holes in the lower socket as shown in FIG. 10b.

In another embodiment shown in FIGS. 9a, 9b, a night vision device 314 is removably secured into an adjustable socket assembly 352. The adjustable socket assembly has an upper socket 353 and a lower socket 354 coupled to the upper socket by screws 360 (FIG. 11). The upper socket has a contacting surface 359. The lower socket has a contacting surface 357 that abuts contacting surface 359 when the upper socket and lower socket are coupled.

Figure 10A:
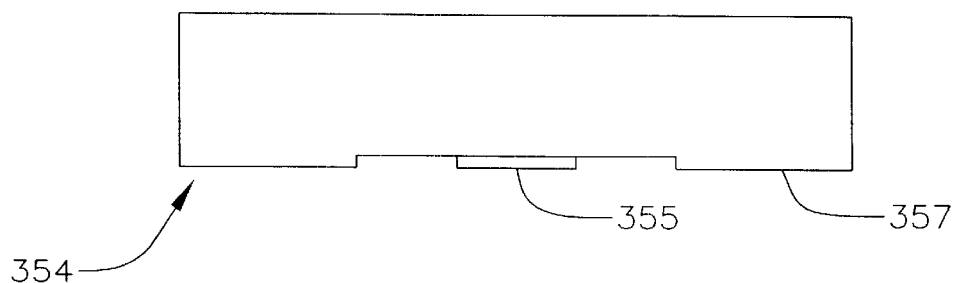
Figure 10B:
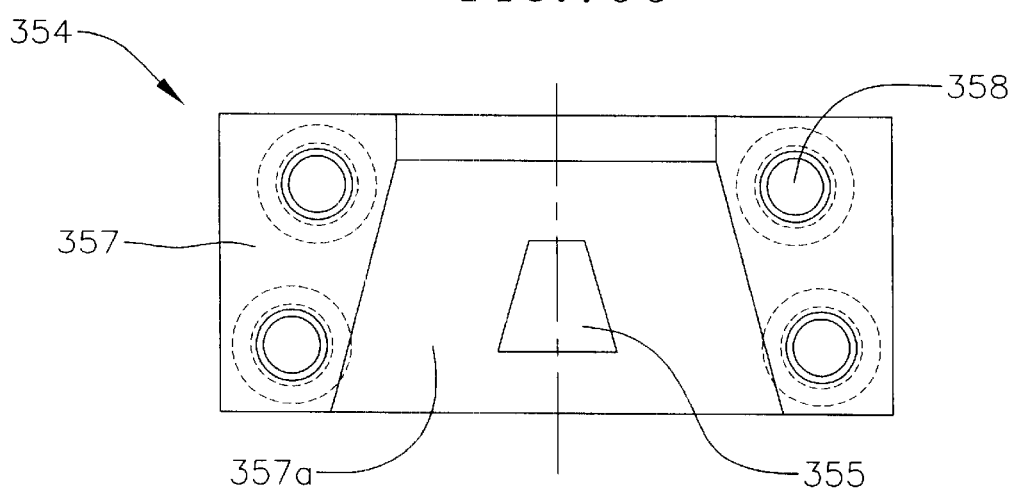
Figure 10C:
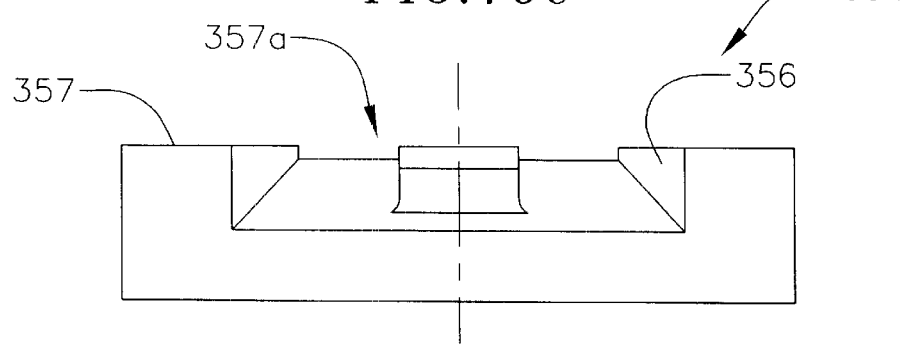

As shown in FIGS. 10a, 10b and 10c, the lower socket has one side of a goggle horn receiving area 357a formed by a tapered recess located centrally across the width of the socket in between contacting surfaces 357. In addition, the lower socket has cylindrical holes 358 that extend from the bottom of the lower socket through contacting surface 357 as shown in FIG. 11. Holes 358 are provided for receipt of screws 360. In a preferred embodiment, there are four holes, with two holes on each side of the goggle horn receiving area.

At an entrance area in the hole is an inwardly sloping entrance or counterbore 358b that is substantially conical-shaped. At the other end of the hole is an area of reduced cross-section 358a having smooth walls. In between the two ends of the hole is a main cylindrical section of the hole having smooth walls. The diameter of the hole near contacting surface 357 is smaller than the diameter throughout the main section. The smaller diameter section of the hole corresponds closely to the outer diameter of screw 360 placed therethrough for reasons described below. However, the screw is able to slide freely relative to the hole.

Each screw 360 has a main cylindrical body. At one end of the main cylindrical body is a threaded tip 361. At an opposite end of the main cylindrical body is a conical-shaped enlarged head 362 that corresponds to inwardly sloping entrance 358b. When the screw is placed through hole 358 and fastened into the upper socket as described below, the top head is spaced from the inwardly sloping entrance about 20/1000".

Wrapped around the cylindrical main body of the screw is a spring 363. In hole 358, the spring is limited on one end by conical shaped enlarged head 362, and on the other end by the area of reduced cross-section in the hole. The spring biases the screw outwardly in the hole, such that the screw head will normally remain spaced from the hole and hold the upper socket against the lower socket such that the contacting surfaces abut.

In a preferred embodiment the spring is made from 316 stainless steel. The passivation process to neutralize the material of the spring so as to avoid corrosion is controlled by government specification no. QQ-P-35C. The set length of the spring is 0.250 inch. The diameter of the wire is 0.024 inch. The diameter of the spring is 0.170 inch. The pitch of the spring is 0.050 inch. The ends of the spring are closed and ground, and the spring is set solid. In a particularly preferred embodiment, the spring is manufactured by C&F Wire, Buena Park, Calif., part no. 1555055.

Figure 12A:
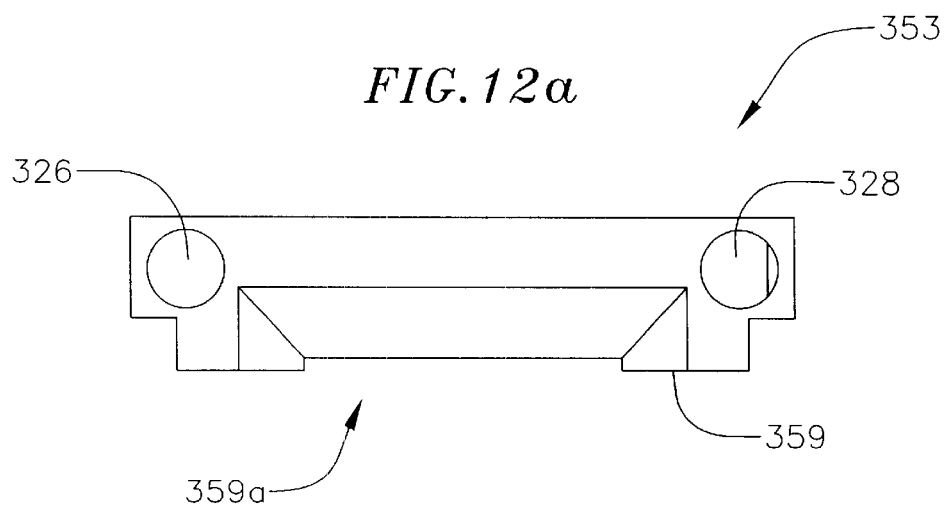
Figure 12B:
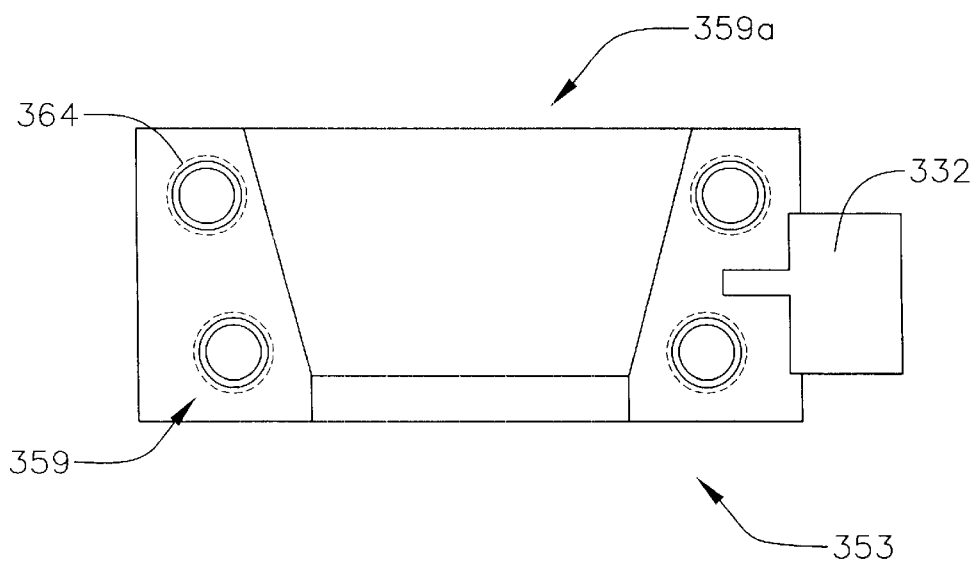

As shown in FIGS. 12a and 12b, a recess extending centrally across the width of the upper socket 353 in between contacting surfaces 359 forms the other side of a goggle horn receiving area 359a. In addition, through contacting surfaces 359 of the upper socket are threaded holes 364 for receipt of and threaded connection to threaded tips 361 of the screws. There are four holes, with two holes on each side of the goggle horn receiving area. Each of these threaded holes 364 correspond to one of the holes of the lower socket.

Along inside surfaces of the recesses extending across the upper and lower sockets are sloping inner walls 356 that taper from a larger aperture on a front side of the socket assembly to a smaller aperture on a back side of the socket assembly. As shown in FIGS. 10a to 10c, on a bottom inner wall of the lower socket is a detent 355 used to securely connect the helmet mount with the night vision device. Detent 355 has a front surface that slopes back toward the back side of the socket assembly. The detent further has a back surface that hooks into the night vision device for secure assembly. The night vision device is removable from the socket assembly through use of a lever provided in the night vision device.

As shown in FIG. 9a, the night vision device has a goggle horn 315 that is slidable into the adjustable socket assembly in between the upper and lower sockets. The goggle horn is manufactured to a certain specification within certain allowable tolerance levels. Generally, the tolerance levels are 10/1000". The goggle horn is wedge-shaped such that it has a larger front area that tapers down to a smaller back area. The sloping inner walls of the recesses in the upper and lower sockets that taper from the front side of the socket assembly to the back side generally correspond to the wedge-shape of the goggle horn.

The goggle horn has an aperture on a bottom side (not shown) for receipt of the detent.

The goggle horn slides over detent 355 until the detent is received into the aperture of the goggle horn. With contacting surfaces 357, 359 of the lower and upper sockets adjoining, the screws each with the surrounding spring are slid through holes 358 in the lower socket and then fastened into corresponding threaded holes 364 of the upper socket. The threaded end of the screw fastens into the threaded hole of the upper socket a limited distance such that there is a small distance (e.g. 20/1000") between the top head of the screw and the tapered entrance of the smooth hole.

When fastened together with the spring connection, the lower and upper sockets are capable of separating up to 20/1000" apart as the goggle horn slides into the socket assembly. In the case where the specification and the tolerances are at or near a maximum dimension for the goggle horn, the goggle horn that is placed into the front aperture of the socket assembly forces the upper and lower sockets apart until the detent is received into the goggle horn. Threaded bottom 361 of the screw remains in the upper socket so that the screw remains fixed relative to the upper socket and is pulled upward in the hole as the upper and lower sockets are moved apart until the top head of the screw abuts inwardly sloping entrance 358b. The distance between the top head of the screw and inwardly sloping entrance 358b is about 20/1000", which allows the lower and upper sockets to separate that distance.

When the detent is received into the goggle horn, the spring biases the sockets to their original positions thereby pulling the lower socket closer to the upper socket, and pushing top head 362 away from inwardly sloping entrance 358b.

Automatic Shut Down Assembly

Figure 3:
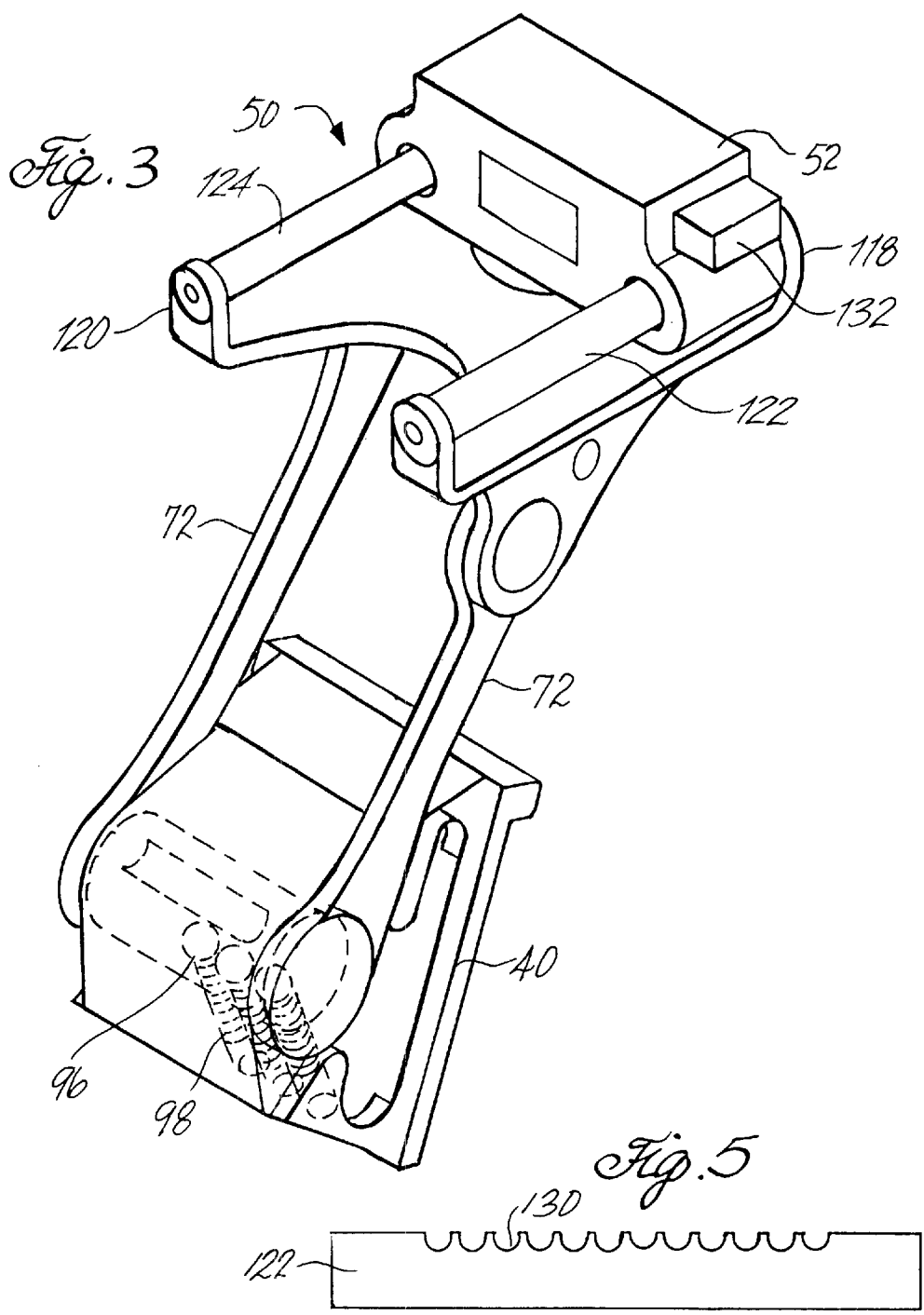
FIG. 3 is a perspective view of the flip-up helmet mount of FIG. 1 in a stowed position.

The flip-up helmet mount 10 enables an operator to adjust night vision device 14 between a use or operation position, shown in FIG. 1, and a non-use or stowed position, shown in FIG. 3. The flip-up helmet mount automatically shuts down the night vision device when in the stowed position. More particularly, the flip-up helmet mount provides for reliable, substantially quiet and essentially jam proof, automatic shutdown of the night vision device.

The night vision device includes a power supply in the form of a battery pack (not shown) internal to housing 18. A power supply circuit provides power to an image intensifier tube (not shown), which supplies to eye pieces 20 an intensified image in phosphor yellow/green light of the scene viewed by objective lens 16. The power supply circuit also includes a magnetically-responsive switch, schematically indicated as 138 in FIG. 2. The switch 138 maintains electrical power supply to the night vision device once it is turned on by the user only so long as a magnetic field of sufficient strength is supplied to switch 138. An automatic shutdown assembly is practically essential when using a flip-up helmet mount, because if the user forgets to turn off the night vision device before moving it to the stowed position, the phosphor yellow/green light emitted from eye pieces 20 would be visible to possibly hostile personnel in front of the user. The phosphor yellow/green light would appear as a pair of small spot lights and may be visible at great distances at night, indicating the position of the user of the night vision device to those in front of the user.

Accordingly, the flip-up helmet mount includes an automatic shutdown assembly 140 to provide the necessary magnetic flux to switch 138 when the night vision device is in the use position, while at the same time insuring that the magnetic field is removed from the switch when the night vision device is pivoted to the stowed position. The automatic shutdown assembly includes a magnet module 142 in socket assembly 52. Magnet module 142 is located at a rear section 144 of the socket assembly, immediately above magnetically responsive switch 138 of the night vision device. Module 142 has a vertically extending cavity 146, having a substantially oval-shaped profile, as can be seen in FIGS. 6 and 7. Cavity 146 includes two ends, a use end 148 adjacent to switch 138, and a stowed end 150 opposite switch 138.

Slidably received within the cavity 146 is a cylindrical bar magnet member 162. Bar magnet 162 provides sufficient magnetic flux to switch 138 to keep the night vision device turned on so long as magnet 162 is in, or immediately adjacent to, use end 148 of cavity 146. As can be seen from FIG. 6, magnet 162 is in this position when the night vision device is in the use position. By way of contrast, however, when the user flips-up the night vision device into the stowed position, gravity acts on the bar magnet to move the magnet away from use end 148 of the cavity toward stowed end 150 of cavity 146. The bar magnet is sufficiently far enough from the magnetically responsive switch when it is in the stowed end of the cavity that the night vision device is automatically turned off.

Figure 13:
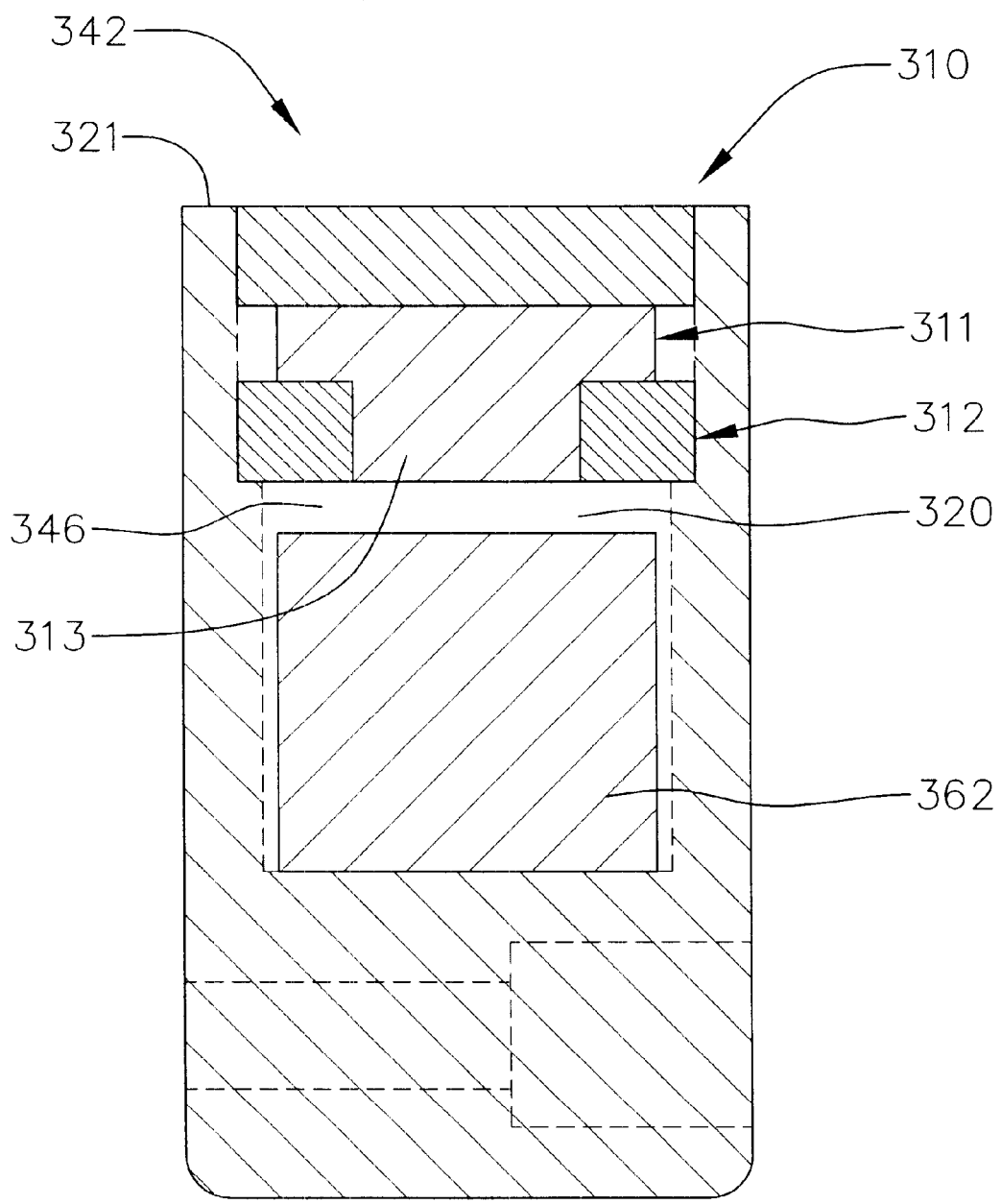
FIG. 13 is a cross-sectional view of an embodiment of a magnet module assembly.

In a preferred embodiment shown in FIGS. 13–16, a magnet module assembly 342 under construction has a cavity 346 opened up to a top surface 321 of the magnet module assembly. The cavity is oval-shaped with each end 348, 350 of the cavity being rounded. Through the open top surface of the magnet module assembly 342 a magnet 362 is inserted into the cavity 346. The magnet is cylindrical and has a generally square shaped cross-section when cut lengthwise as shown in FIG. 13.

Figure 16A:
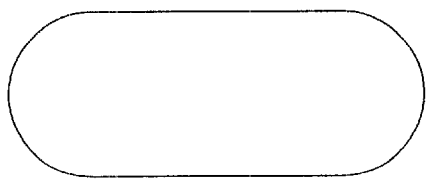
FIG. 16a is a top view of a cap of the magnet module assembly of FIG. 13.
Figure 16B:
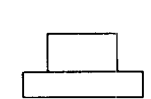
FIG. 16b is a side view of a plug of the magnet module assembly of FIG. 13.
Figure 16C:
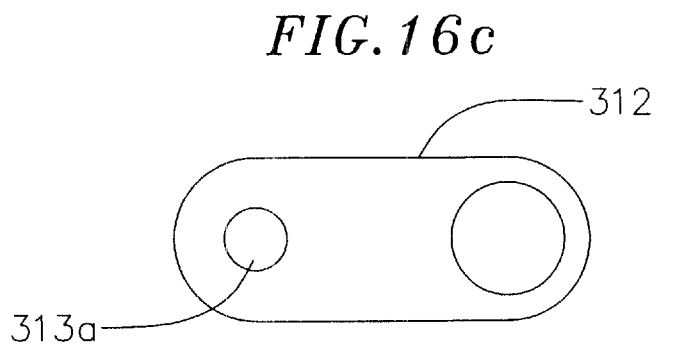
FIG. 16c is a top view of a screen of the magnet module assembly of FIG. 13.
Figure 16D:
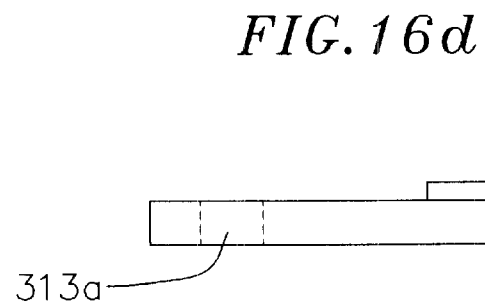
FIG. 16d is a side view of the screen of FIG. 16c.

A screen 312 is fit into the magnet module assembly over top of the magnet. The screen is oval-shaped to correspond with the shape of the cavity. As shown in FIGS. 16c and 16d the screen has a hole 313a through one end of the screen, and a circular protrusion 313b on another end. The damping fluid is inserted with a syringe into hole 313a of the screen. When the cavity is filled with the damping fluid, a plug 311 is inserted into hole 313a. When inserted in hole 313a, the plug corresponds in shape to the circular protrusion on the screen. A cap is then fit over the plug and circular protrusion flush with top surface 321 of the magnet module assembly and then sealed with an adhesive.

The damping fluid 320 is placed in cavity 346 around and over the magnet to dampen the movement of the magnet and to eliminate noise from the magnet contacting the magnet module assembly. Further, when the user of the night vision device is in motion, the damping fluid substantially maintains the magnet in the use or stowed position. Thus, in order to turn the night vision device light on and off, there is required a deliberate rotational motion between positions shown in FIGS. 14 and 15.

Figure 14:
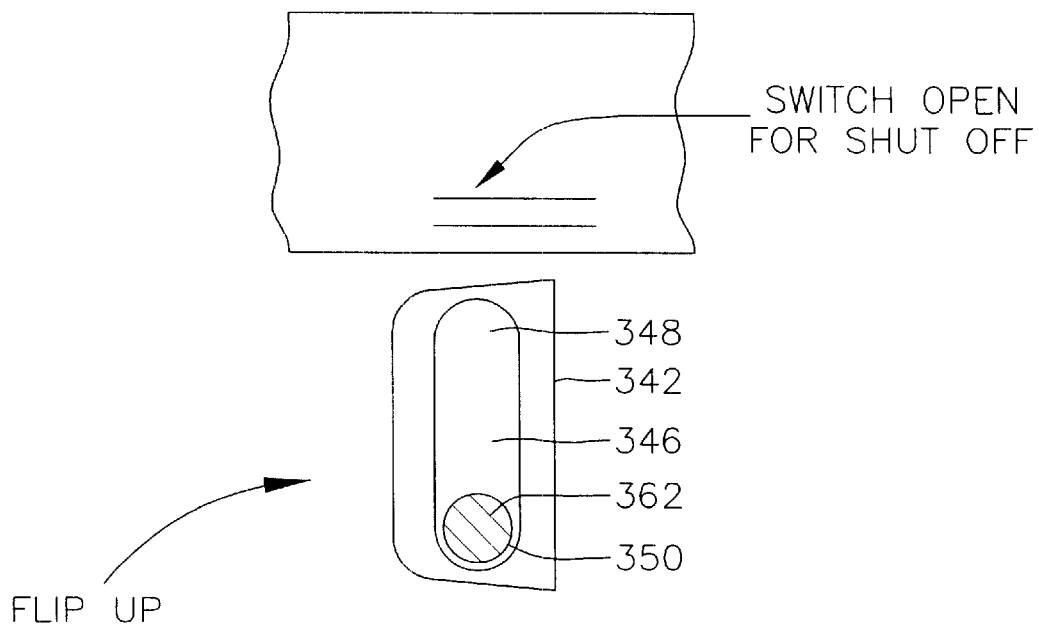
FIG. 14 is a partial cross-sectional view of the magnet module assembly of FIG. 13 when the night vision device is in the use position.
Figure 15:
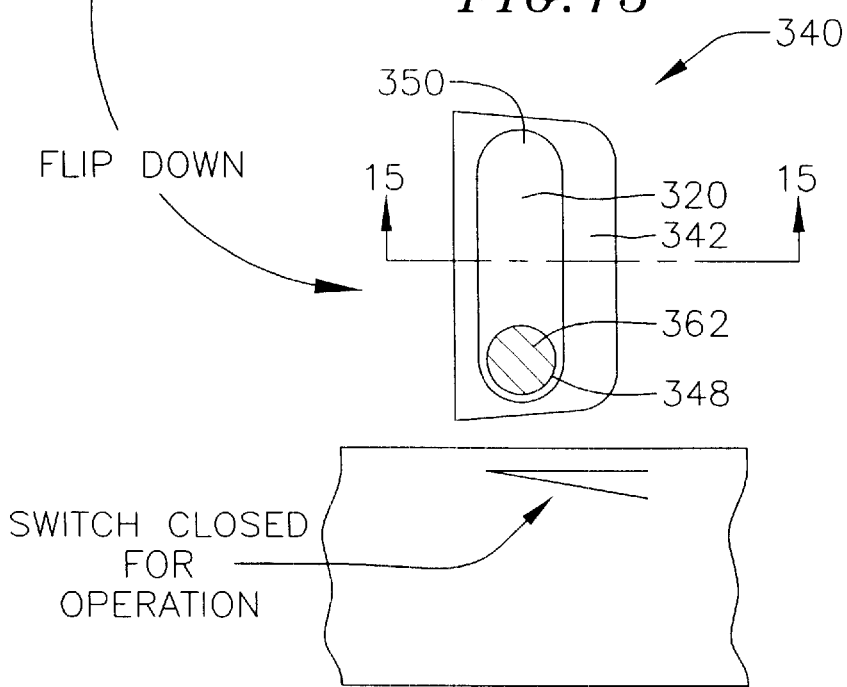
FIG. 15 is a partial cross-sectional view of the magnet module assembly of FIG. 13 when the night vision device is in the stowed position.

FIGS. 14 and 15 disclose cut away top views of the magnet module assembly 342 with the magnet placed in cavity 346 to assist in showing its relative position in the cavity. Similar to the embodiment shown in FIGS. 7 and 8, the magnet is movable from a first position in one cavity end 348 that operates the night vision device to a second position in an opposite cavity end 350 that shuts off the night vision device operation.

In a preferred embodiment, damping fluid 320 is a viscous liquid which is free from suspended matter and sediment. The fluid has a viscosity in the range of 5 cs to 15 cs, and a specific gravity at 77° F. in the range of 0.85 to 0.95. The viscosity of the damping liquid is preferably stable over the temperature range of –60° F. to 158° F. The damping fluid is preferably inert and has low air entrapment. These features are preferred so that the damping effect of the fluid remains relatively the same over time with use and during use in different surrounding environments.

Preferably, the fluid is a dimethyl silicone fluid. More preferably, the damping fluid is a polymethylsiloxane polymer manufactured to yield essentially linear polymers with an average kinematic viscosity of about 10 cs. A preferred damping fluid may be obtained from Dow Corning, Midland, Mich., product no. 200 Fluid, 10 cs.

One of the important advantages of automatic shutdown assembly 140 provided for in the flip-up helmet mount is that it is more reliable than the assemblies provided for in the prior art. The reliability of the shutdown assembly is due in part to the substantially straight cavity and the dimensions of the bar magnet, specifically the length-to-diameter ratio of the magnet. In a presently preferred embodiment, the magnet is a ¼ inch long, ¼ inch diameter cylindrical bar. Preferably, the length to diameter ratio of the bar magnet is about 1:1.

In use of the flip-up helmet mount, the operator first secures the quick release mechanism assembly to the helmet and then secures the flip-up mount to the quick release mechanism assembly. Once the flip-up mount is secured to the helmet, the night vision device may be secured to the socket assembly and adjusted into its use position seen in FIG. 1. As so positioned, the bar magnet member is positioned such that the night vision device remains on once the operator switches it on. In this position, the operator is able to adjust the tilt and focus of the goggle using a single hand, allowing the operator to optimize the viewing conditions of the goggle without occupying both of his hands during the adjustment process. When the operator flips the goggle up to its stowed position, the goggle is automatically turned off, as explained above.

POSITION ADJUSTMENT

In FIG. 1, the night vision device is positioned in front of the operator's eyes so that the operator may look through the eye pieces 20 of the night vision device. However, the flip-up helmet mount also allows the operator to flip the night vision device into a stowed position, completely above the line of sight of the operator, to permit normal, unobstructed vision.

In order to enable the operator to adjust the position of the night vision device, the night vision device is rotationally coupled with helmet block 40. A cylindrical shaft 70 is rotationally received within transverse bore 48 of the helmet block. Coupled with and carried by shaft 70 is bracket member 60. The bracket member includes a pair of spaced apart flange portions 72, which are coupled together by a transverse web portion 74. Proximal ends of flange portions 76, 78 of the bracket member are coupled with respective ends of cylindrical shaft 80, 82. Additionally, distal ends of flange portions 84, 86 of the bracket member are coupled with a respective side of the chassis 88, 90. Chassis 50 is coupled with bracket member 60 to allow some rotation of the chassis relative to the bracket member. The coupling of shaft 70 to bracket member 60, the bracket member to the chassis, and the night vision device to the chassis results in the night vision device being rotationally coupled with helmet block 40.

Additionally, in order to provide retention of the night vision device in either of its operation or stowed position, the flip-up helmet mount includes a spring-biased ball and detent system 92 within the helmet block as shown in FIG. 6. A plurality of bores 94 are provided within the helmet block for receiving a plurality of spring-biased ball plungers 96. A spring 98 extends through each of the plurality of bores 94. One end 97 of each spring is pinned or fixed, and the other end 99 of each spring bears against a smooth ball plunger 96. The bores are located within the helmet block so that the spring pressure biases the ball plungers against cylindrical shaft 70. Additionally, the bores are located within the helmet block so that the ball plungers are aligned parallel to axis of rotation 71 of the shaft.

A pair of transverse detents 102 extend along the length of shaft 70. The detents receive the spring-biased ball plungers 96 to releasably retain the night vision device in either the use or stowed position. Detents 102 are angularly located on shaft 70 to correspond, respectively, to the use and stowed position of the night vision device. Generally speaking, the detents are located about 180 degrees apart on the shaft. More particularly, shaft 70 is located within transverse bore 48 of helmet block 40 such that when the night vision device is in the use position, ball plungers 96 are biased by spring pressure into the use detent (not shown). Conversely, when the night vision device is in the stowed position, ball plungers 96 are biased by spring pressure into stowed detent 102. As the user adjusts the night vision device from the use to the stowed position, the spring-biased ball plungers are released from the use detent, and eventually engage the stowed detent, once the goggle has been rotated out of the user's line of sight and into the stowed position.

Preferably, the spring pressure is such that the friction between the balls and the shaft is sufficient to retain the night vision device in a selected position even if the night vision device has not been fully rotated into the use or stowed position. In other words, the spring pressure should be sufficient to prevent a pivotal free fall of the night vision device should the user not detent the system in its stowed position.

It should be obvious to one skilled in the art that the force required to adjust the night vision device from the use to the stowed position will depend on a number of factors, including, the number of spring-biased plungers, the size of the spring-biased plungers, the strength of the springs, the depth of the detents, etc. In a presently preferred embodiment, these and other variables have been selected to satisfy the current specifications of the United States Army with respect to helmet mount assemblies, and in particular, the requirements of QAP No. A3260927. In order to satisfy these requirements, in a presently preferred embodiment, three spring-biased ³⁄₁₆th inch smooth ball plungers are adapted to engage an use detent having a depth of about 0.05 inches, and a stowed detent, having a depth of about 0.075 inches. Obviously, however, the specifics of any of these variables may vary with the requirements of the application for which the flip-up mount is being used.

One of the important advantages of the spring-biased ball and detent assembly is that it provides for extremely quiet operation of the flip-up helmet mount as the night vision device is adjusted between the use and stowed position. Additionally, the spring-biased ball and detent assembly allows for simple, one-handed adjustment of the night vision device between the use and stowed position.

Preferably, the helmet block and the spring-biased ball and detent system are designed to optimize the durability of the flip-up helmet mount. In particular, in a presently preferred embodiment, the helmet block is designed without any stops on the body of the helmet block corresponding to the stowed position. Prior art flip-up helmet mounts typically include at least one stop on a side of the helmet block to prevent the flip-up helmet mount from over rotating when stowed. The flip-up mount may over rotate if an excessive amount of force is applied to the mount, for example, when the flip-up mount is attached to the helmet and the helmet is dropped on the flip-up mount. In attempting to prevent over rotation of the flip-up mounts, the stops often exert an excessive force on a small section of the flip-up mount that may result in failure of the structure. Therefore, it is believed that removing the stops corresponding to the stowed position of the helmet will increase the durability of the flip-up mount. In particular, removing the stops will cause the night vision device to first contact the helmet if the flip-up mount over rotates. Additionally, the spring-biased ball and detent system will act as a buffer to absorb some of the energy and momentum of the night vision device as it begins to over rotate.

Tilt Adjustment

In addition to allowing for adjustment of the position of the night vision device, the flip-up helmet mount also allows for adjustment of the tilt of the night vision device relative to the user's eyes. In a presently preferred embodiment shown in FIG. 2, a cam system 104 is provided to permit tilt angle adjustment of chassis 50. The cam system 104 includes a cam knob 106 located adjacent the distal end one of the flanges of bracket member 60. Rotation of the cam knob 106 causes rotation of a cam 108 and of a shaft 110. Shaft 110 rotationally couples the chassis 50 to the bracket member. Therefore, rotation of cam knob 106 results in rotation of the chassis, and thus tilting of the night vision device relative to the user's eyes. In a presently preferred embodiment, the cam system includes a friction washer 51 on the back side of the cam, which produces enough friction such that the chassis will not slip under normal operating conditions.

One of the important advantages of the cam operated tilt adjustment assembly 104 is that it allows for simple, one-handed tilt angle adjustment of the night vision device. As can be appreciated from FIG. 2, tilt adjustment can be accomplished by using only one hand to turn the cam knob. The design of the cam operated tilt adjustment assembly allows for real-time adjustment of the tilt angle of the night vision device. Moreover, the cam operated tilt adjustment assembly allows for substantially infinite adjustment of the tilt angle within a predetermined range, rather than limiting the tilt angle adjustment to one of a plurality of predetermined levels.

Focal Adjustment

The flip-up helmet also allows for focal adjustment of the location of the night vision device relative to the user's eyes. As described above, the night vision device is coupled with the socket assembly 52 on the chassis. As shown in FIG. 3, the chassis includes a pair of side members 112, 114, connected by a central member. Each side member has a front depending segment 118 and a rear depending segment 120. A pair of racks 122, 124 extend between the front and rear depending segments. Socket assembly 52 has a pair of holes 126, 128 on opposite ends of the socket assembly. Through holes 126, 128, the socket assembly is slidably received on racks 122, 124. As a result, when the night vision device is in the use position, the location of socket assembly 52 may be adjusted relative to the chassis along the racks 122, 124, resulting in adjustment of the location of the night vision device 14 relative to the user's eyes.

In order to provide for retention of the night vision device 14 once focal adjustment is complete, as shown in FIG. 5, a plurality of notches 130 are provided on one of racks 122 for engagement of a release lever 132. Release lever 132 is biased under spring pressure to engage one of the notches in the rack 122, essentially locking the night vision device in a selected position relative to the user's eyes. In order to adjust the position of the night vision device relative to the user's eyes, it is simply necessary to apply a downward force to the release lever 132. The downward force causes the release lever to pivot around a pin, disengaging the lever from notch 130. Once the release lever has been disengaged from the notch, the position of the night vision device 14 may be adjusted by moving the socket assembly 52 forward or backward along racks 122, 124 of the chassis 50. When the night vision device has been positioned as desired, the user may release the lever, which will be biased into one of the notches by a return spring.

Figure 4:
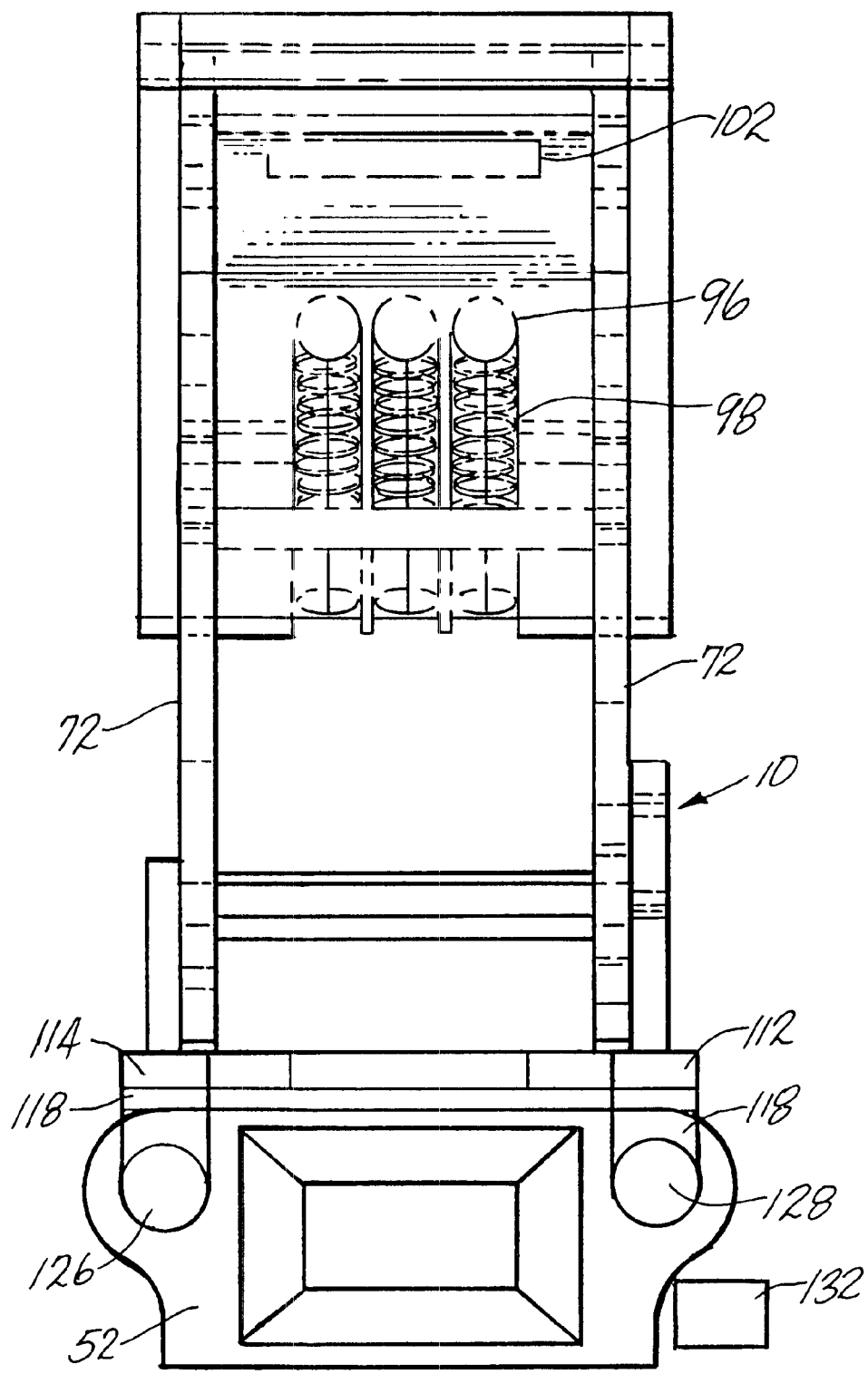
FIG. 4 is a front elevation view of the flip-up helmet mount of FIG. 2.

Again, one of the important advantages of the focal adjustment assembly provided for in the flip-up helmet mount is that it allows for simple, one-handed focal adjustment of the night vision device. As can be appreciated from FIG. 4, focal adjustment can be accomplished by using only one hand to push downward on release lever 132. Moreover, the use of a single release lever requiring the application of a downward force to permit focal adjustment is believed to be ergonomically superior to the designs disclosed in the prior art.

It should be noted that in a presently preferred embodiment, a number of the components of the flip-up helmet mount are made from aluminum. Prior art helmet mounts were generally made from plastic. The novel design of the flip-up helmet mount provided for in the present invention, permits the use of aluminum for a number of components, providing added strength and stability to the structure, while not increasing the overall weight of the flip-up helmet mount when compared to the plastic versions disclosed in the prior art. Specifically, in the presently preferred embodiment where only the helmet block and the magnet module remain plastic, the flip-up helmet mount is approximately 10% lighter than most of the prior art plastic flip-up mounts.

While various embodiments of this invention have been shown and described, it would be apparent to those skilled in the art that many more modifications are possible without departing from the inventive concept herein. For example, although the tilt and focal adjustment assemblies have been illustrated on one side of the flip-up helmet mount, it should be realized that the assemblies could easily be located on either side of the flip-up helmet mount. In other words, the flip-up helmet mount could be designed for one-handed operation by either the right or left hand of the user. It is, therefore, to be understood that within the scope of the appended claims, this invention may be practiced otherwise than as specifically described.

What is claimed is:

1. A flip-up helmet mount for a night vision device having a goggle horn with variable dimensions, the flip-up helmet mount comprising:

a helmet block adapted to secure the flip-up helmet mount to a helmet;

a chassis adapted to receive the night vision device;

a bracket member, extending between the helmet block and the chassis adapted to rotationally couple the chassis to the helmet block;

a one-handed position adjustment assembly within the helmet block to adjust the night vision device between a use position and a stowed position;

a one-handed tilt angle adjustment assembly to adjust a tilt angle of the chassis relative to the bracket member; and a one-handed focal adjustment assembly to adjust a location of the night vision device relative to the chassis, wherein the chassis includes an adjustable socket assembly having an upper socket, and a lower socket coupled with and movable relative to the upper socket to accommodate the goggle horn with variable dimensions between the upper and lower sockets.

2. The flip-up helmet mount according to claim 1 further comprising an automatic shutdown assembly adapted to influence a magnetically-responsive switching device on the night vision device, the magnetically-responsive switching device maintaining the night vision device switched on when under the influence of a sufficient magnetic field, and effecting shutdown of the night vision device when the switch is no longer under the influence of the sufficient magnetic field.

3. The flip-up helmet mount according to claim 2 wherein the automatic shutdown assembly comprises a magnet module adjacent the magnetically-responsive switch, the magnet module having a cavity with a substantially oval-shaped profile, the cavity including a use end adjacent the magnetically-responsive switch and a stowed end opposite the magnetically-responsive switch, and a bar magnet slidably received within the cavity, and wherein, as the night vision device is rotated between the use position and the stowed position, the magnet moves between the use end of the cavity, where the magnet provides the sufficient magnetic field required to keep the night vision device on, and the stowed end of the cavity, where the magnet does not provide the sufficient magnetic field to the switch.

4. The flip-up helmet mount according to claim 3 wherein a damping fluid is enclosed with the magnet in the magnet module to dampen the movement of the magnet from one of the use and stowed positions to the other of the positions so as to substantially eliminate noise associated with contact of the magnet against the magnet module.

5. The flip-up helmet mount according to claim 4 wherein the damping fluid has a viscosity in the range of 5 cs to 15 cs.

6. The flip-up helmet mount according to claim 4 wherein the damping fluid is a dimethyl silicone fluid and has a viscosity of about 10 cs, wherein the viscosity of the damping fluid remains substantially the same through a temperature range of −60° F. to 158° F.

7. The flip-up helmet mount according to claim 3 wherein a damping means for damping the movement of the magnet in the magnet module when the magnet moves between one of the use and stowed positions to the other of the positions so as to substantially eliminate noise associated with contact of the magnet against the magnet module.

8. The flip-up helmet mount according to claim 1 wherein the night vision device is slidably received on a pair of racks of the chassis and the focal adjustment assembly includes a release lever that is biased by a return spring to engage one of a plurality of notches on one of the racks to retain the night vision device in a selected location relative to the chassis.

9. The flip-up helmet mount according to claim 8 wherein the release lever is hingedly connected to the chassis so that application of a substantially downward force on the release lever disengages the release lever from the one of a plurality of notches, permitting adjustment of the location the night vision device relative to the chassis.

10. The flip-up helmet mount according to claim 1 wherein the lower socket has a smooth hole with a tapered entrance end and another end with reduced cross-sectional area for receipt of a screw with a threaded end and a head end, wherein the upper socket has a threaded hole for receipt of the threaded end of the screw, wherein the screw is surrounded by a spring in the hole of the lower socket, wherein the spring is bounded on one end by the end with reduced cross-section area and on the other end by the head end of the screw, wherein the threaded end of the screw fastens into the threaded hole of the upper socket such that there is a distance between the head end of the screw and the tapered entrance of the smooth hole, wherein the spring tensions the lower socket to render the lower socket substantially immobile relative to the upper socket, wherein the lower socket moves relative to the upper socket with the attached screw when the goggle horn is inserted between the upper and lower sockets such that goggle horn of variable dimensions fit into the adjustable socket assembly.

11. A flip-up helmet mount for a night vision device having a goggle horn with variable dimensions, the flip-up helmet mount comprising:

a helmet block for securing the flip-up helmet mount to a helmet;

a chassis for receiving the night vision device, wherein the chassis has an adjustable mounting means for receiving the goggle horn for connection of the night vision device to the helmet mount;

a bracket member, extending between the helmet block and the chassis for rotationally coupling the chassis to the helmet block;

position adjustment means for adjusting the night vision device between a use position and a stowed position;

tilt angle adjustment means for adjusting a tilt angle of the chassis relative to the bracket member;

focal adjustment assembly for adjusting a location of the night vision device relative to the chassis; and automatic shutdown means for influencing a magnetically-responsive switching device on the night vision device, the magnetically-responsive switching device maintaining the night vision device switched on when under the influence of a sufficient magnetic field, and effecting shutdown of the night vision device when the switch is no longer under the influence of the sufficient magnetic field, wherein the automatic shutdown assembly comprises a magnet module adjacent the magnetically-responsive switch, the magnet module having a cavity with a substantially oval-shaped profile, the cavity including a use end adjacent the magnetically-responsive switch and a stowed end opposite the magnetically-responsive switch, and a bar magnet slidably received within the cavity, and wherein, as the night vision device is rotated between the use position and the stowed position, the magnet moves between the use end of the cavity, where the magnet provides the sufficient magnetic field required to keep the night vision device on, and the stowed end of the cavity, where the magnet does not provide the sufficient magnetic field to the switch, wherein a damping means for damping the movement of the magnet in the magnet module when the magnet moves between one of the use and stowed positions to the other of the positions so as to substantially eliminate noise associated with contact of the magnet against the magnet module, wherein the position adjustment means, the tilt angle adjustment means, and the focal adjustment means are all designed to allow one-handed adjustment of the flip-up helmet mount.

12. A flip-up helmet mount for a night vision device, the flip-up helmet mount comprising:

a helmet block securing the flip-up helmet mount to a helmet;

a chassis slidably receiving the night vision device;

a bracket member, extending between the helmet block and the chassis, rotationally coupling the chassis to the helmet block;

a one-handed position adjustment assembly within the helmet block adjusting the night vision device between a use position and a stowed position;

a one-handed tilt angle adjustment assembly adjusting a tilt angle of the chassis relative to the bracket member;

a one-handed focal adjustment assembly adjusting a location of the night vision device relative to the chassis; and an automatic shutdown assembly influencing a magnetically-responsive switching device on the night vision device, the magnetically-responsive switching device maintaining the night vision device switched on when under the influence of a sufficient magnetic field, and effecting shutdown of the night vision device when the switch is no longer under the influence of the sufficient magnetic field, wherein the automatic shutdown assembly includes a magnet module adjacent the magnetically-responsive switch, the magnet module having a cavity with a substantially oval-shaped profile, the cavity including a use end adjacent the magnetically-responsive switch and a stowed end opposite the magnetically-responsive switch, and a bar magnet slidably received within the cavity, and wherein, as the night vision device is rotated between the use position and the stowed position, the magnet moves between the use end of the cavity, where the magnet provides the sufficient magnetic field required to keep the night vision device on, and the stowed end of the cavity, where the magnet does not provide the sufficient magnetic field to the switch, wherein a damping fluid is in the cavity with the magnet to dampen the magnet movement when the magnet moves between one of the use and stowed positions to the other of the positions so as to substantially eliminate noise associated with contact of the magnet against the magnet module.

13. An automatic shutdown assembly adapted for use in a flip-up helmet mount for a night vision device, the automatic shutdown assembly comprising:

a magnet module adapted to influence an adjacent magnetically responsive switching device on the night vision device, the magnet module having vertically extending cavity with a substantially oval-shaped profile, the cavity including a use end adjacent the magnetically-responsive switch and a stowed end opposite the magnetically-responsive switch, and a bar magnet slidably received within the cavity, wherein as the night vision device is rotated between a use position and a stowed position, the magnet moves between the use end of the cavity, where the magnet provides a magnetic field sufficient to keep the night vision device on, and the stowed end of the cavity, where the magnet does not provide the magnetic field sufficient to keep the night vision device on, wherein a damping fluid is in the cavity with the magnet to dampen the magnet movement when the magnet moves between one of the use and stowed positions to the other of the positions so as to substantially eliminate noise associated with contact of the magnet against the magnet module.

14. An adjustable mounting. device for use in a flip-up helmet mount for a night vision device having a goggle horn with variable dimensions, the adjustable mounting device comprising:

a chassis adapted to receive the night vision device, wherein the chassis includes an adjustable socket assembly having an upper socket, and a lower socket coupled with and movable relative to the upper socket to accommodate the goggle horn with variable dimensions between the upper and lower sockets.

\* \* \* \* \*